May 12, 1942.  R. SNOOK  2,283,101
ROTARY SNOW PLOW
Filed March 10, 1941  2 Sheets-Sheet 2
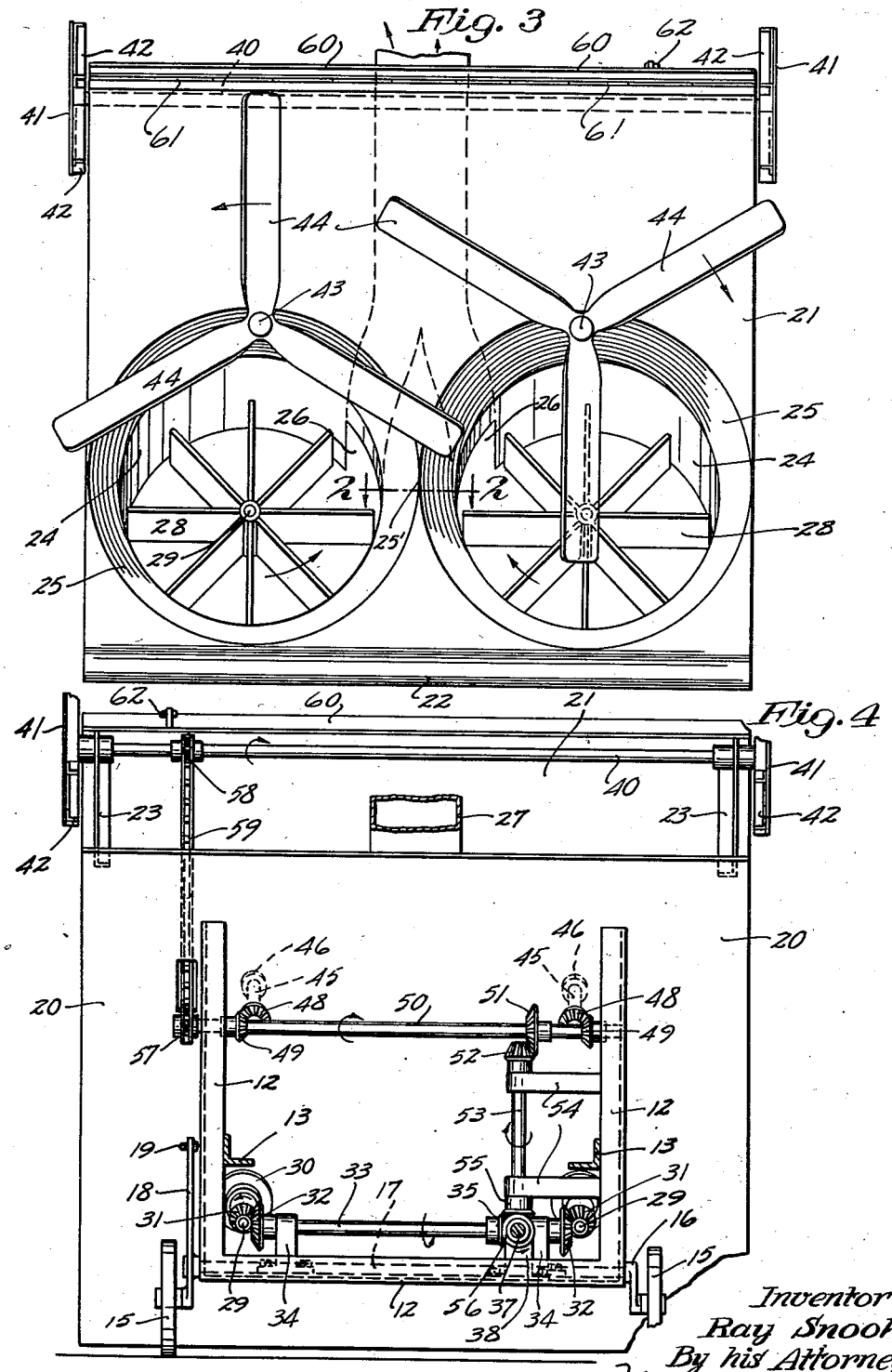
Inventor
Ray Snook
By his Attorneys
Merchant & Merchant Patented May 12, 1942

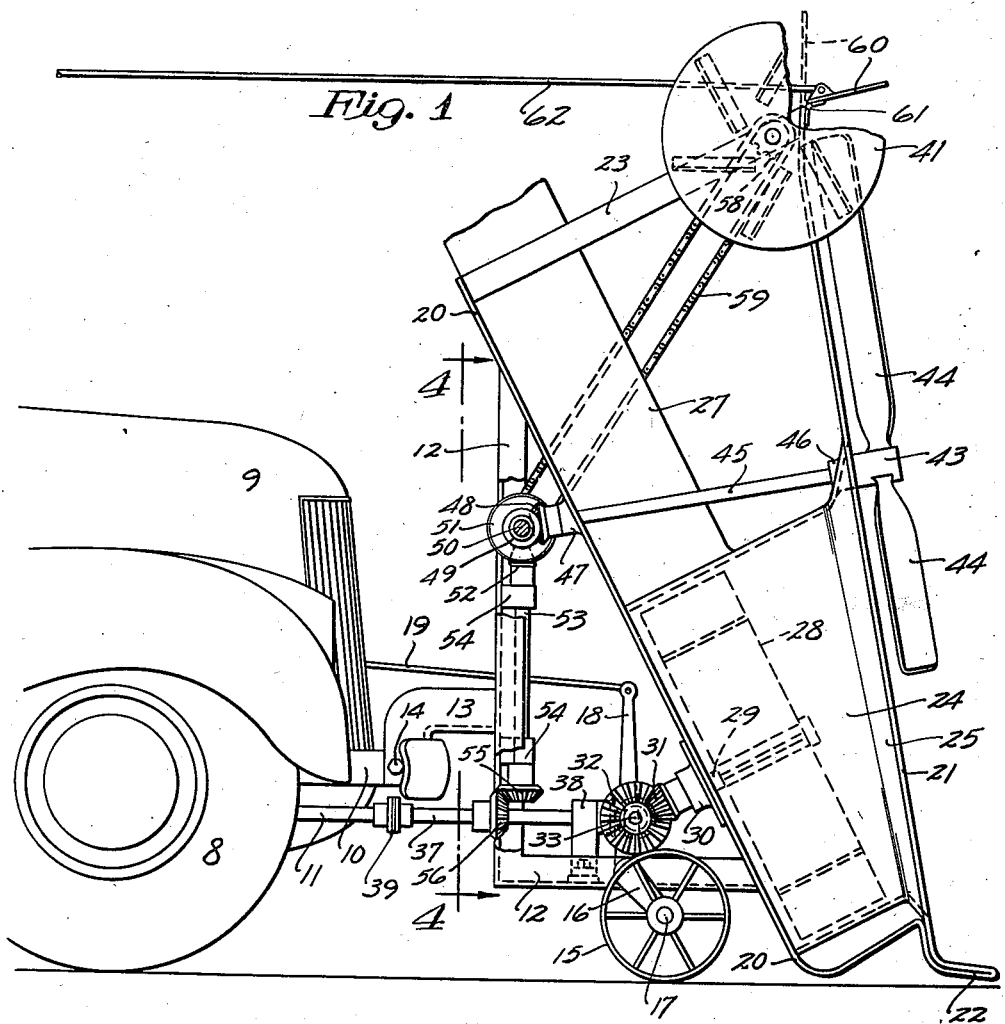
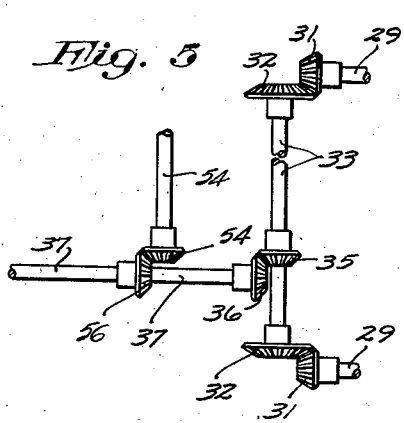
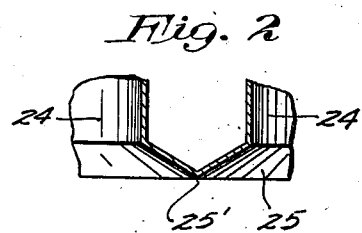

2,283,101

UNITED STATES PATENT OFFICE 2,283,101

ROTARY SNOWPLOW

Ray Snook, Windom, Minn.

Application March 10, 1941, Serial No. 382,502

4 Claims. (Cl. 37—43)

My present invention relates to snow plows and is particularly directed to the improvement of highway snow plows of the rotary type.

Generally stated, the invention consists of the novel devices, combinations of devices and arrangement of parts hereinafter described and defined in the claims.

The snow plow proper is arranged to be connected to, driven from, and pushed ahead of a motor-propelled vehicle, which latter may be of the tractor type or of the motor truck type. Preferably, the plow is made detachable from the motor-propelled vehicle so that the latter may be independently used; and, moreover, the snow plow may be mounted upon its own wheels or may be carried from the main frame of the tractor or motor-propelled vehicle.

The invention is illustrated in the accompanying drawings wherein like characters indicate like parts throughout the several views.

Referring to the drawings:

Fig. 1 is a view in side elevation, with some parts broken away, showing the improved rotary snow plow connected to and driven from a motor-propelled vehicle such as a truck;

Fig. 2 is a fragmentary section taken on the line 2—2 of Fig. 3.

Fig. 3 is a front elevation of the snow plow, with some parts broken away and some parts removed;

Fig. 4 is a section taken approximately on the line 4—4 of Fig. 1 looking forward or toward the front of the plow; and Fig. 5 is a fragmentary diagrammatic plan view showing the driving gears.

In Fig. 1 the numerals 8, 9 and 10 indicate, respectively, the front wheels, front body portion and frame of the truck or motor-propelled vehicle which is provided with a forwardly extended transmission shaft 11 which, in the well-known way, will be driven from the motor of the truck or vehicle.

The snow plow is provided with a strong frame 12 preferably made from angle beams. This frame 12, in side elevation, is approximately L-shaped and it is provided with rigidly secured rearwardly extended brackets 13 that are pivoted at 14 to the front end of the truck frame 10. This pivot 14 may be a bolt which, when removed, will permit the plow frame to be detached from the tractor frame. The frame 12 is preferably mounted on front wheels 15 journaled to the free ends of arms 16 of a transverse crankshaft 17 journaled in suitable bearings on the lower portion of the frame 12, see Figs. 1 and 4.

In this particular illustration the crank shaft 17 has a long arm 18, the upper end of which, by means of an operating rod 19, is connected to a suitable operating device assumed to be on the tractor.

Rigidly secured to the lower front and upper rear portions of the frame 12 is a strong flat and very wide back plate 20 which, at its lower end, is bent forward and rigidly connected to a flat and wide face plate 21. The manner of connecting the plates 20 and 21 may be varied but, as shown, these two plates are united and forwardly bent at 22 to form a cutting blade or scraper that will run close to the road bed. The back plate 20 has considerably greater inclination than the face plate 21 but both are forwardly inclined. At its upper end the face plate 21 is rigidly secured to the top of plate 20 and through the latter to the upper portion of the frame 12 by suitable devices such as rigid metallic spacing and supporting bars 23. The face plate 21 is formed with a pair of very large approximately cylindrical pockets 24, the outwardly flaring annular rims 25 of which come into close contact at 25', as shown in Figs. 2 and 3, at the central portion of the face plate and the outer edges of which preferably extend to the outer edges of the face plate. The snow-receiving pockets 24, as already indicated, are cylindrical and at points near their adjacent walls are formed with outlet ports or passages 26 that lead to a common discharge stack 27. It may be here stated that in practice this snow outlet stack 27 will preferably be provided with a discharge end or portion, not shown, but which, in accordance with common practice in rotary snow plows, will be movable to discharge snow, at will, at either side of the plow. The bottoms of the pockets 24 are closed by the rear or back plate 20.

Working in the pockets are fan-like heads 28 secured on the front ends of shafts 29 that extend at 90° to the plates 20 and are journaled in suitable bearings 30 on said plate 20. At their rear ends shafts 29 are provided with bevel pinions 31 that mesh with bevel gears 32. Bevel gears 32 are secured on the opposite ends of a transverse shaft 33 mounted in bearings 34 on the rear lower portion of frame 12.

Shaft 33, at its intermediate portion, is provided with a bevel gear 35 that meshes with a similar bevel gear 36 carried by a shaft 37 journaled in a suitable bearing 38 on the base of frame 12, see particularly Figs. 1 and 5, but also note Fig. 4.

Shaft 37 is axially aligned with the motor-driven shaft 11 of the tractor or motor-propelled vehicle and is connected thereto by a suitable coupling 39 which should be of a flexible or yielding character that will permit movements of the frame 12 in respect to the truck frame 10, on the coupling pivot 14 without straining the driving connection between the two shafts 11 and 37.

Journaled in the forwardly projecting portions of the frame extensions or arms 23 is a transverse shaft 40 which, at its outer ends, is provided with wheel-like deflecting discs 41 which, on their opposing inside faces, are provided with ribs or flanges 42.

Working close to the front or face plate 21, one slightly above each of the pockets 24, are combined cutting and deflecting heads involving hubs 43 with long sharp edged blades 44 radiating from said hubs. These hubs 43 are secured to the front ends of shafts 45 that extend at right angles to the plate 21 and are journaled in bearings 46 and 47, respectively, on the plates 21 and 20. At their rear ends shafts 45 are provided with bevel pinions 48 that mesh with bevel pinions 49 on a transverse shaft 50 that is journaled in suitable bearings on the upright rear portion of frame 12.

Shaft 50, at its intermediate portion, is provided with a bevel gear 51 that meshes with a bevel pinion 52 on the upper end of a short shaft 53 that is journaled in bearing members 54 on the upright rear portion of frame 12. At its lower end upright shaft 53 is provided with a bevel pinion 55 that meshes with a bevel gear 56 on the driving shaft 37.

At one end transverse shaft 50 is provided with a sprocket 57 that is aligned with a sprocket 58 on the upper transverse shaft 40. A sprocket chain 59 runs over the sprockets 57 and 58.

Means has now been described for driving all of the moving parts of the machine, from the power transmission shaft of the truck or motor-propelled vehicle, through the shaft 37. The directions in which the various rotary parts will be rotated is, in most instances, indicated by arrows marked thereon, but the following further comments are thought desirable.

The fan-acting propeller heads 28 will be rotated in reverse directions, that is, directions being taken in respect to Fig. 3, the left-hand fan head will be rotated in a counter-clockwise direction and the right-hand fan head will be rotated in a clockwise direction, these directions of rotation being those that will project the snow to the discharge spout through the ports 26 and will create a strong blast of air with the snow outward through said ports and discharge passage. The blades 44 of the cutter heads are arranged to rotate in the same directions as the fan heads with which they directly co-operate and over and in front of which they operate, and the said blades are beveled or set so that they will deflect the snow into the pockets. The chief function, however, of the blades is to cut through the snow that is being pressed into the pockets under the forward movement of the machine and to break up the snow so that it can be more easily handled by the fan heads. The blades 44 are made quite long so that they will sweep in front of the major portions of the pockets. The blades, in fact, will overlap but are so geared that the blades of the one head will not engage with the blades of the other head. Of course, the cutter heads may be provided with any desired number of blades and while one blade for each head might be sufficient for some purposes, the plurality of blades is better and does not require such high speed of rotation of the cutter heads.

Under forward movement of the machine against a snow bank the snow will, of course, be pressed into the pockets and must be very rapidly broken up and delivered out of the pockets by the fan heads. As already indicated, the cutter blades 44 cut into and disintegrate the snow bank and assist in delivery thereof into the pockets. By reference to Fig. 1 it will be noted that the upper portions of the pockets are deeper than the lower portions and that the cutter blades 44 work with greatest efficiency over the deep upper portions of the pockets and break up the snow where there would be the greatest danger of bridging over of the snow in the pockets.

In cutting into deep snow banks the deflecting discs or wheels 41 perform very important functions. The discs, it will be noted, are approximately aligned with the outer edges of the front plate 21 and if the plow is forced into a very deep bank the discs will cut a sharp line through the bank and will tear down the snow bank so that the front plate can pass into the bank. Moreover, these blade-equipped deflecting wheels tend to throw the snow downward onto the inclind front plate and toward the pockets.

The operation of the snow plow has, in a general way, already been indicated, but may be briefly summarized as follows:

Under forward movement of the plow the snow will be crowded into the pockets and by the action of the fans will be thrown outward by centrifugal force and by the air blast will be carried from the pockets through the delivery stack and through the discharge stack. When the plow is forced against a snow bank or deep snow on the road bed, the snow will be crowded upward on the front plate and crowded into the pockets and the delivery of the snow into the pockets will be assisted by the action of the blades 44. If a very deep snow bank is encountered, the disc-like wheels 41 will cut into the bank at the very edges of the face plate 21 and the snow cut loose from the bank, but said wheels will be forced downward and the snow cut into by the said discs will be thrown downward and subjected to the action of the blades 44. Any snow that is pressed against the conical rims 25 will be crowded into the pockets. It is important that the rear plate 20, in which the pockets are formed, should have a greater inclination than the front plate so that gravity will have a better chance to assist in delivering snow into the pockets; and in such an arrangement the operation of the cutter blades 44, at the upper portion of the pockets where the pockets are deepest, is highly important.

The drawings and the above specification disclose a machine which, at the present time, is considered a preferred form, but it will be understood that various alterations and modifications in the structure and arrangement of the parts may be made within the scope of the invention.

As a further and important feature I apply a baffle plate 60 which is pivoted to said plate at 61 and is connected to the front end of an operating rod 62, as shown in Fig. 1. This baffle plate 60, when turned forward and downward, as shown by full lines in Fig. 1, lies directly over the upper path of movement of the blades 44 and prevents the snow from being thrown vertically upward. When not desired as a baffle the plate 60 can be thrown upward to the dotted line position, Fig. 1.

What I claim is:

1. In a snow plow, a supporting frame, an inclined face plate and an inclined back plate secured on said frame, said face plate having laterally spaced pockets with their bottoms closed against said back plate, said pockets having peripheral discharge passages leading to a discharge stack, power driven rotary fan-acting heads working in said pockets, a pair of power driven blade-equipped cutter heads working in front of said face plate and over the upper portions of said pockets, and in which said cutter heads are so set and timed that their blades move through interlapping planes without interfering contact.

2. In a snow plow, a supporting frame, an inclined face plate and an inclined back plate secured on said frame, said face plate having laterally spaced pockets with their bottoms closed against said back plate, said pockets having peripheral discharge passages leading to a discharge stack, power driven rotary fan-acting heads working in said pockets, a pair of power driven blade-equipped cutter heads working in front of said face plate and over the upper portions of said pockets, and in further combination with a transverse power driven shaft extended across the upper portion of said face plate and provided at its ends with blade-equipped cutter wheels that work closely adjacent to the opposite edges of the upper portion of said face plate.

3. In a snow plow, a supporting frame and face plate supported at the front of said frame and a back plate secured to said frame and face plate, said face plate having a snow-receiving pocket the bottom closed against said back plate and having a peripheral discharge port, a discharge stack leading from said discharge port, a power driven rotary fan head working in said pocket, and a power driven rotary cutter head located in front of said face plate and having at least one blade arranged to sweep over and in front of said pocket, and in further combination with a baffle pivotally secured to said front plate immediately over the upper path of movement of said cutter head and having a rearwardly extending operative connection.

4. In a snow plow, a supporting frame and face plate supported at the front of said frame and a back plate secured to said frame and face plate, said face plate having a snow-receiving pocket the bottom closed against said back plate and having a peripheral discharge port, a discharge stack leading from said discharge port, a power-driven rotary fan head working in said pocket, and a power-driven rotary cutter head located in front of said face plate and having at least one blade arranged to sweep over and in front of said pocket, and in which said face plate and back plate are rearwardly inclined, the angle of inclination of the back plate being greater than that of the face plate, thereby rendering the pocket deeper at its upper than at its lower portion.

RAY SNOOK.